United States Patent
Chen et al.

(10) Patent No.: US 11,654,631 B2
(45) Date of Patent: May 23, 2023

(54) PROCESSING CARRIER MODULE AND SPIN DRY DEVICE

(71) Applicant: TPK Glass Solutions (Xiamen) Inc., Xiamen (CN)

(72) Inventors: Feng Ming Chen, Xiamen (CN); Zhi Min Shao, Xiamen (CN); Jin Run Lin, Xiamen (CN)

(73) Assignee: TPK Glass Solutions (Xiamen) Inc., Fujian (CN)

( * ) Notice: Subject to any disclaimer, the term of this patent is extended or adjusted under 35 U.S.C. 154(b) by 66 days.

(21) Appl. No.: 17/335,280

(22) Filed: Jun. 1, 2021

(65) Prior Publication Data

US 2021/0402698 A1     Dec. 30, 2021

(30) Foreign Application Priority Data

Jun. 29, 2020   (CN) ......................... 202010608051.8
Sep. 29, 2020   (CN) ......................... 202011048653.9

(51) Int. Cl.
    *B29C 64/357*     (2017.01)
    *B29C 64/245*     (2017.01)
    *B33Y 40/00*     (2020.01)
    *B33Y 30/00*     (2015.01)

(52) U.S. Cl.
    CPC .......... *B29C 64/357* (2017.08); *B29C 64/245* (2017.08); *B33Y 30/00* (2014.12); *B33Y 40/00* (2014.12)

(58) Field of Classification Search
    CPC ..... B29C 64/357; B29C 64/245; B33Y 30/00; B33Y 40/00
    See application file for complete search history.

(56) References Cited

U.S. PATENT DOCUMENTS 4,148,733 A * 4/1979 Gamble ................. A01K 59/04
                                              210/361
4,310,119 A * 1/1982 Culhane .................... B04B 5/04
                                              210/361

FOREIGN PATENT DOCUMENTS

CN           205112414 U     3/2016
TW           M608034 U     2/2021

* cited by examiner

*Primary Examiner* — Joseph S Del Sole
*Assistant Examiner* — John Robitaille
(74) *Attorney, Agent, or Firm* — Cooper Legal Group, LLC

(57) ABSTRACT

The present disclosure is related to a processing carrier module comprising a carrier layer and a container. The carrier layer comprises a carrier surface, a first lateral surface, and a second lateral surface. The first lateral surface is connected to carrier surface and has at least one first protruding structure. The second lateral surface is connected to carrier surface and has at least one second protruding structure. The first lateral surface is opposite to the second lateral surface. The container comprises at least one first fastening structure and at least one second fastening structure. The first fastening structure and the second fastening structure are respectively disposed on opposite sides of the container. The first fastening structure engages with the first protruding structure, and the second fastening structure engages with the second protruding structure.

20 Claims, 6 Drawing Sheets

PROCESSING CARRIER MODULE AND SPIN DRY DEVICE

RELATED APPLICATION

This application claims priority to China Application Serial Number 202010608051.8, filed Jun. 29, 2020, and China Application Serial Number 202011048653.9, filed Sep. 29, 2020. China Application Serial Number 202010608051.8 and China Application Serial Number 202011048653.9 are herein incorporated by reference.

BACKGROUND

Field of Disclosure

The present disclosure is related to a field of processing technology, in particular to a processing carrier module and a spin dry device.

Description of Related Art

In recent years, with the continuous development of manufacturing techniques using additives, three-dimensional (3D) printing techniques that can quickly manufacture three-dimensional objects have begun to be fully applied in design, manufacturing, and production lines. With the control of computers and the continuously additive processes, 3D printing techniques can quickly print 3D objects with any shape and geometric characteristics according to the 3D models or other electronic data.

In the existing 3D printing techniques, the method of manufacturing three-dimensional objects using the photo-curing properties and thermoplastic properties of various resins is one of the main development projects. However, after the three-dimensional object is cured, the resin remaining on the three-dimensional object must be removed by spinning. However, these residual resins are easily contaminated in the spin dry devices and cannot be reused, thereby forming waste materials and increasing the overall manufacturing cost.

SUMMARY

An aspect of the present disclosure is to provide a processing carrier module. The processing carrier module can recycle resin and has an advantageous function of recycling resin.

According to an embodiment of the present disclosure, a processing carrier module comprises a carrier layer and a container. The carrier layer comprises a carrier surface, a first lateral surface, and a second lateral surface. The first lateral surface is connected to the carrier surface and has at least one first protruding structure. The second lateral surface is connected to the carrier surface and has at least one second protruding structure. The first lateral surface is opposite to the second lateral surface. The container comprises at least one first fastening structure and at least one second fastening structure. The first fastening structure and the second fastening structure are respectively disposed on opposite sides of the container. The first fastening structure engages with the first protruding structure, and the second fastening structure engages with the second protruding structure.

According to an embodiment of the present disclosure, a spin dry device comprises a shell, a rotating device, and the processing carrier module. The rotating device is connected to the shell by a first rotating shaft. A plurality of containing spaces are defined between the shell and the rotating device. Two sides of each of the plurality of containing spaces have a locking recess, and an extending direction of the locking recess is the same as a rotating direction of the first rotating shaft. The processing carrier module is arranged in one of the plurality of containing spaces, and a portion of the processing carrier module inserts into the locking recess of the two sides of the one of the plurality of containing spaces.

In an embodiment of the present disclosure, the container comprises a receiving layer, a first sidewall, and a second sidewall. The first sidewall is opposite to the second sidewall. The receiving layer is connected to the first sidewall and the second sidewall. The first fastening structure is defined in the first sidewall, and the second fastening structure is defined in the second sidewall.

In an embodiment of the present disclosure, the carrier layer comprises a third lateral surface. The third lateral surface has a first holding structure. The container comprises a third sidewall. The third sidewall has a first opening. The first holding structure passes through the first opening. The third sidewall is connected to the first sidewall, the second sidewall, and the receiving layer.

In an embodiment of the present disclosure, the container comprises a fourth sidewall opposite to the third sidewall, and the fourth sidewall has a second opening.

In an embodiment of the present disclosure, the third sidewall has a first height in a first direction. The fourth sidewall has a second height in the first direction. The first height is greater than the second height, and the first direction is parallel to a normal vector of the carrier surface.

In an embodiment of the present disclosure, the fourth sidewall in a first direction has a distance from the carrier surface, and the first direction is parallel to a normal vector of the carrier surface.

In an embodiment of the present disclosure, the first lateral surface has a second holding structure disposed on an edge of the first lateral surface facing away from the carrier surface. The first protruding structure is disposed adjacent to the carrier surface. The second lateral surface has a third holding structure disposed on an edge of the second lateral surface facing away from the carrier surface. The second protruding structure is disposed adjacent to the carrier surface.

In an embodiment of the present disclosure, the second holding structure and the third holding structure extend along a second direction. Each of the first fastening structure and the second fastening structure is a bent opening. A portion of the first fastening structure and a portion of the second fastening structure extend along the second direction.

In an embodiment of the present disclosure, the first protruding structure is disposed on an edge of the first lateral surface facing away from the carrier surface. The second protruding structure is disposed on an edge of the second lateral surface facing away from the carrier surface. The first protruding structure and the second protruding structure extend along a second direction. The first fastening structure comprises a first recess extending along the second direction. The second fastening structure comprises a second recess extending along the second direction.

In an embodiment of the present disclosure, the container comprises a third opening and a fourth opening. The third opening is adjacent to the first recess, and the fourth opening is adjacent to the second recess.

It is understood that the carrier layer of the processing carrier module in the embodiments of the present disclosure may provide a carrier surface. When users print 3D objects on the carrier surface by 3D printing, the container of the processing carrier module may receive the resin separated from the 3D objects during the spin dry process. The spin dry device in the embodiments of the present disclosure can effectively recycle the residual resin during the process.

BRIEF DESCRIPTION OF THE DRAWINGS

Aspects of the present disclosure are best understood from the following detailed description when read with the accompanying figures. It is noted that, in accordance with the standard practice in the industry, various features are not drawn to scale. In fact, the dimensions of the various features may be arbitrarily increased or reduced for clarity of discussion.

DETAILED DESCRIPTION

Reference will now be made in detail to the present embodiments of the disclosure, examples of which are illustrated in the accompanying drawings.

The processing carrier module in the embodiments of the present disclosure can be applied in three-dimensional (3D) printing systems.

It is noted that the terms, such as "first," "second," "third," and the like, may be used to describe various components, elements, regions, layers, or portions, but these components, elements, regions, layers, or portions are not limited in this regard. These terms are only used to differentiate a component, element, region, layer or portion from another component, element, region, layer or portion. Therefore, the "first component," "first element," "first region," "first layer," or "first portion" described below may be referred as the "second component," "second element," "second region," "second layer," or "second portion," which does not depart from the spirit of the present disclosure.

On the other hand, for clearly describing, the figures referring to the embodiments of the present description may change their height, thickness, and width according to the viewing angle to describe in detail the relative positions of each component in the embodiments of the present disclosure and are not limited in this regard.

Figure 1:
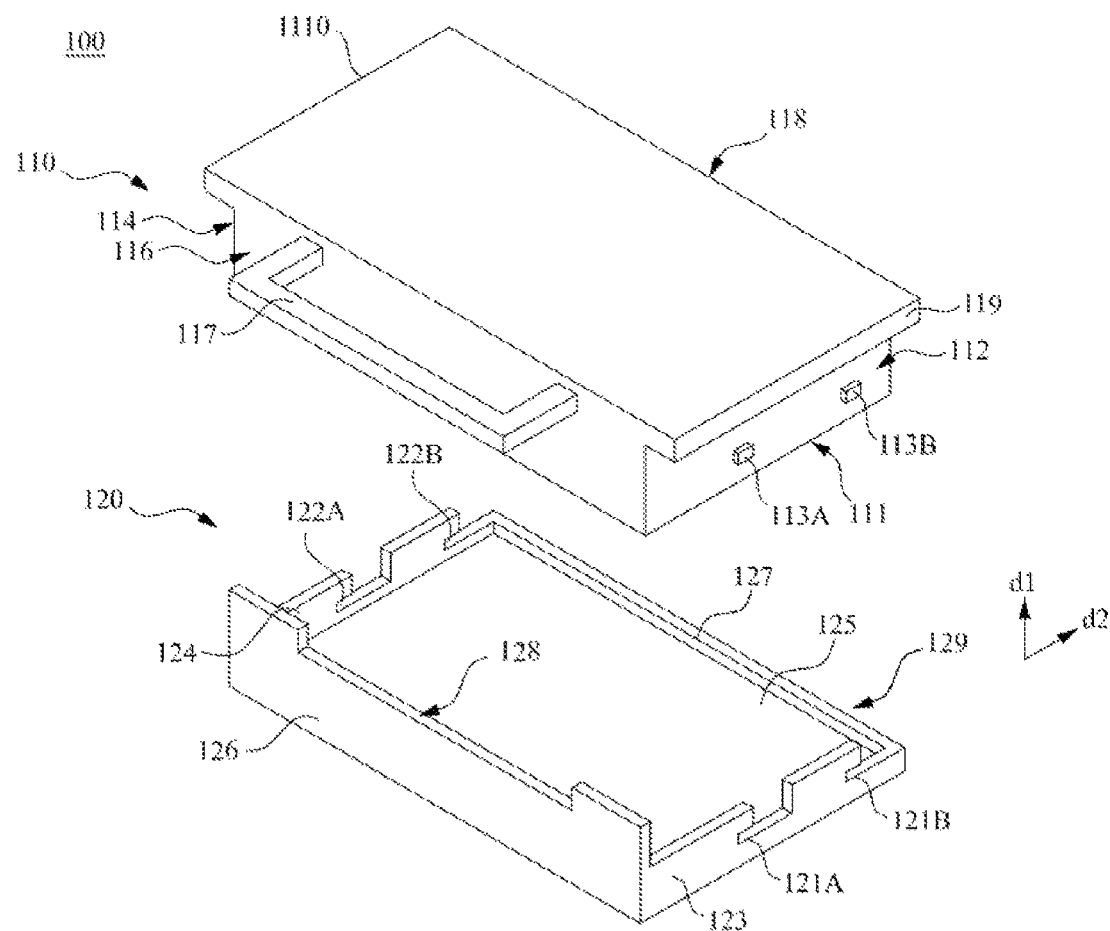
FIG. 1 is a perspective exploded view of a processing carrier module according to an embodiment of the present disclosure.

FIG. 1 is a perspective exploded view of a processing carrier module 100 according to an embodiment of the present disclosure. Please refer to FIG. 1. In the embodiment of the present disclosure, the processing carrier module 100 comprises a carrier layer 110 and a container 120. The carrier layer 110 comprises a carrier surface 111, a first lateral surface 112, and a second lateral surface 114.

The first lateral surface 112 is connected to the carrier surface 111, and the first lateral surface 112 has a first protruding structure 113A and a first protruding structure 113B. The second lateral surface 114 is connected to the carrier surface 111, and the second lateral surface 114 has a second protruding structure (not shown in FIG. 1). The first lateral surface 112 is opposite to the second lateral surface 114.

To be specific, in the embodiment, the first lateral surface 112 has a plurality of first protruding structures 113A and 113B. The second lateral surface 114 also has a plurality of second protruding structures (not shown in FIG. 1). The shapes of the first protruding structures 113A and 113B and the second protruding structures are similar, and the positions are also corresponding to each other.

The container 120 comprises a first fastening structure 121A, a first fastening structure 121B, a second fastening structure 122A, and a second fastening structure 122B. The first fastening structure 121A and the second fastening structure 122A are formed in opposite sides of the container 120. The first fastening structure 121B and the second fastening structure 122B are formed in opposite sides of the container 120.

To be specific, the first fastening structure 121A and the first fastening structure 121B are used for engaging with the first protruding structure 113A and the first protruding structure 113B, respectively. The second fastening structure 122A and the second fastening structure 122B are used for engaging with the second protruding structures of the second lateral surface 114.

Figure 2:
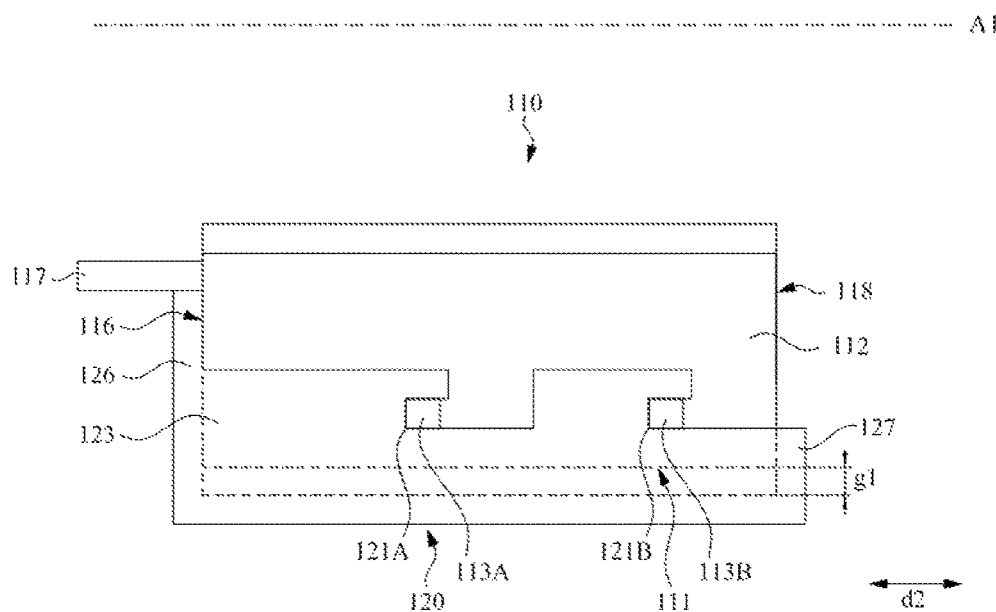
FIG. 2 and FIG. 3 are side views of a processing carrier module according to an embodiment of the present disclosure.
Figure 3:
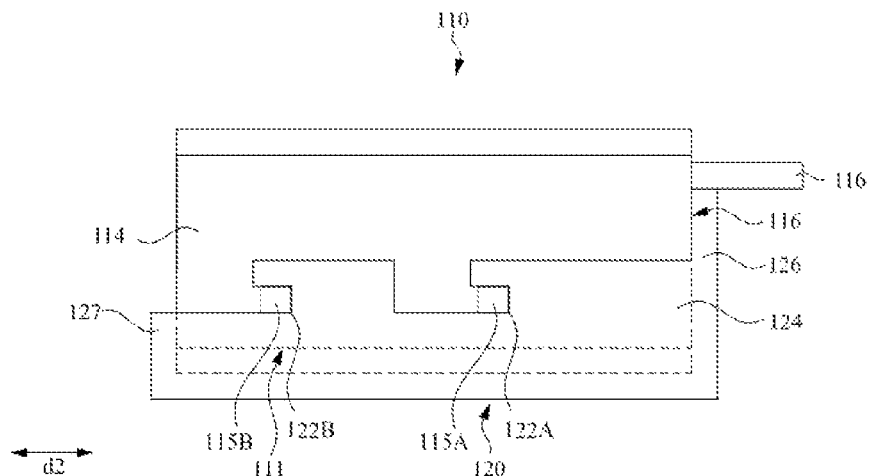

FIG. 2 and FIG. 3 are side views of the processing carrier module 100 according to an embodiment of the present disclosure, wherein FIG. 2 faces toward the first lateral surface 112, and FIG. 3 faces toward the second lateral surface 114. Please refer to FIG. 2. The first fastening structure 121A engages with the first protruding structure 113A on the first lateral surface 112, and the first fastening structure 121B engages with the first protruding structure 113B on the first lateral surface 112. Please refer to FIG. 3. The second lateral surface 114 has a second protruding structure 115A and a second protruding structure 115B. The second fastening structure 122A engages with the second protruding structure 115A on the second lateral surface 114, and the second fastening structure 122B engages with the second protruding structure 115B on the second lateral surface 114.

Please refer to FIG. 2. In the embodiment, there is a distance g1 between the carrier surface 111 and the container 120. The carrier surface 111 is used for carrying a 3D structure formed by 3D printing, and the container 120 may face toward the 3D structure to cover the carrier layer 110. Therefore, when spin drying the processing carrier module 100, the residual resin in the 3D structure on the carrier surface 111 may be received by the container 120, which can prevent the residual resin from being contaminated, thereby providing an advantageous function of recycling.

In particular, for clearly describing the container 120 and the carrier layer 110 of the processing carrier module 100, the distance g1 shown in the figures is reduced. The figures are only used as an example for reference and are not limited in this regard. In some embodiments of the present disclosure, the distance g1 between the carrier surface 111 and the container 120 may be selected to provide sufficient space to enable 3D objects to be contained therein and to provide sufficient space to receive resin.

In detail, please refer to FIG. 1. In the embodiment, the container 120 comprises a receiving layer 125, a first sidewall 123, and a second sidewall 124. The first sidewall 123 is opposite to the second sidewall 124, and the receiving layer 125 is connected to the first sidewall 123 and the second sidewall 124. To be specific, the first sidewall 123 in the embodiment is perpendicularly connected to the receiving layer 125, and the second sidewall 124 is also perpendicularly connected to the receiving layer 125.

The first fastening structure 121A and the first fastening structure 121B are formed in the first sidewall 123, and the second fastening structure 122A and the second fastening structure 122B are formed in the second sidewall 124. Therefore, the first fastening structures 121A and 121B and the second fastening structures 122A and 122B may correspond to each other such that the container 120 may more easily engage with the carrier layer 110.

In the embodiment, the carrier layer 110 comprises a third lateral surface 116 having a first holding structure 117. To be specific, the first holding structure 117 in the embodiment is formed in a U shape to be caught (e.g., held) by hands or mechanical arms. The first holding structure 117 extends outward from the third sidewall 166 along a second direction d2.

On the other hand, the container 120 comprises a third sidewall 126 connected to the first sidewall 123, the second sidewall 124, and the receiving layer 125, and the third sidewall 126 has a first opening 128. Please refer to FIG. 2. When the container 120 engages with the carrier layer 110, the third sidewall 126 is adjacent to the third lateral surface 116, and the first holding structure 117 passes through the first opening 128. Therefore, when users or mechanical arms use the first holding structure 117 to pick up the processing carrier module 100, in addition to the container 120 being engaged with the carrier layer 110 by the first fastening structures 121A and 121B and the second fastening structures 122A and 122B (please refer to FIG. 3), the third sidewall 126 may also carry the third lateral surface 116 such that the relative positions between the container 120 and the carrier layer 110 do not easily change.

Please refer to FIG. 1. In the embodiment, the container 120 further comprises a fourth sidewall 127. The fourth sidewall 127 is opposite to the third sidewall 126, and the fourth sidewall 127 has a second opening 129. The second opening 129 allows a portion of the carrier layer 110 to engage with the container 120.

For example, please refer to FIG. 2, when the processing carrier module 100 rotates along a rotating shaft A1, the resin separated from the carrier surface 111 may move to the receiving layer 125 due to the centrifugal force to be recycled in the container 120. When the rotating shaft A1 extends substantially perpendicular to the ground surface, the first holding structure 117 may be arranged (e.g., turned) upward to facilitate users or mechanical arms picking up the first holding structure 117. The fourth sidewall 127 is located below the receiving layer 125 in the second direction d2 so, when the first holding structure is turned upward, the resin flowing downward from the receiving layer 125 may be received along the fourth sidewall 127.

Figure 4:
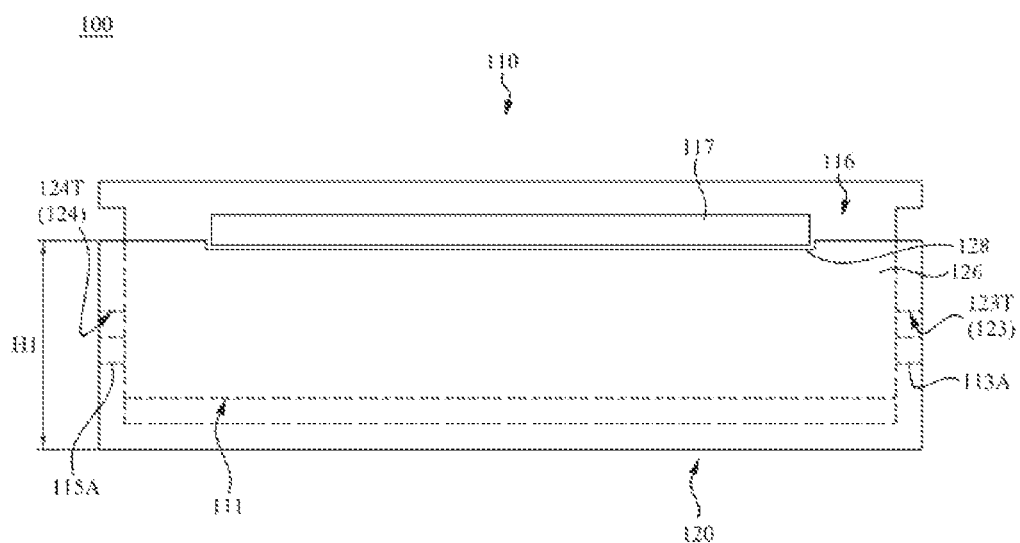
FIG. 4 is a top view of a processing carrier module according to an embodiment of the present disclosure.
Figure 5:
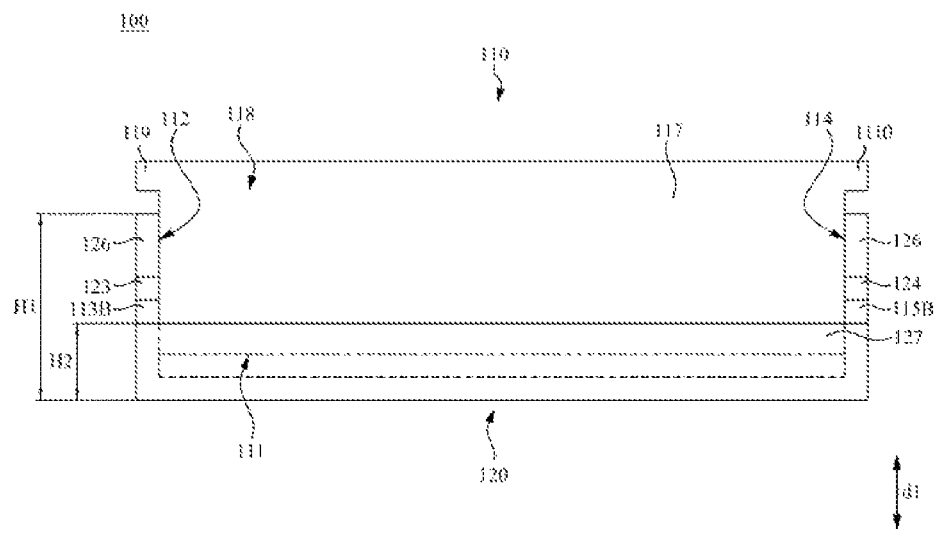
FIG. 5 is a bottom view of a processing carrier module according to an embodiment of the present disclosure.

FIG. 4 is a top view of the processing carrier module 100 according to an embodiment of the present disclosure. FIG. 5 is a bottom view of the processing carrier module 100 according to an embodiment of the present disclosure. Please refer to FIG. 4 and FIG. 5. In the embodiment, the third sidewall 126 has a first height H1 in the first direction d1, and the fourth sidewall 127 has a second height H2 in the first direction d1. The first height H1 is greater than the second height H2, and the first direction d1 is parallel to a normal vector to the carrier surface 111 (i.e., the first direction d1 is perpendicular to the carrier surface 111).

Since the first height H1 is greater than the second height H2, the carrier layer 110 enters from a side adjacent the fourth sidewall 127 to engage with the container 120. Simultaneously, the third sidewall 126 has the higher first height H1 and a bigger area, so the third sidewall 126 is used for carrying the third lateral surface 116 of the carrier layer 110 such that engagement between the container 120 and the carrier layer 110 may be more stable. On the other hand, the third sidewall 126 also exceeds (i.e., is above) an upper edge 123T of the first sidewall 123 and an upper edge 124T of the second sidewall 124. Therefore, when the carrier layer 110 engages with the container 120 by the first protruding structure 113A and the second protruding structure 115A, the larger area of the third sidewall 126 results in the amount of the third lateral surface 116 being carried to be bigger, which can inhibit turning over during the spinning process.

Please refer to FIG. 5. In the embodiment, the first lateral surface 112 has a second holding structure 119. The second holding structure 119 is formed on an edge of the first lateral surface 112 facing away from the carrier surface 111. The first protruding structure 113B is disposed adjacent to the carrier surface 111 relative to the second holding structure 119. That is, in the first direction d1, the first protruding structure 113B is located between the carrier surface 111 and the second holding structure 119.

The second lateral surface 114 has a third holding structure 1110. The third holding structure 1110 is formed on an edge of the second lateral surface 114 facing away from the carrier surface 111. The second protruding structure 115B is disposed adjacent to the carrier surface 111 relative to the third holding structure 1110. That is, in the first direction d1, the second protruding structure 115B is located between the carrier surface 111 and the third holding structure 1110.

Further, please refer to FIG. 1. The second holding structure 119 and the third holding structure 1110 extend along the second direction d2. Each of the first fastening structures 121A and 121B and the second fastening structures 122A and 122B is a bent opening. A portion of the first fastening structure 121A extends along the second direction d2, and a portion of the first fastening structure 121B also extends along the second direction d2. A portion of the second fastening structure 122A extends along the second direction d2, and a portion of the second fastening structure 122B also extends along the second direction d2.

Further, the ends of each of the first fastening structures 121A and 121B and the second fastening structures 122A and 122B extend toward the third sidewall 126 along the second direction d2. Therefore, the carrier layer 110 may engage with the container 120 along the second direction d2 toward the third sidewall 126 of the container 120.

Figure 6:
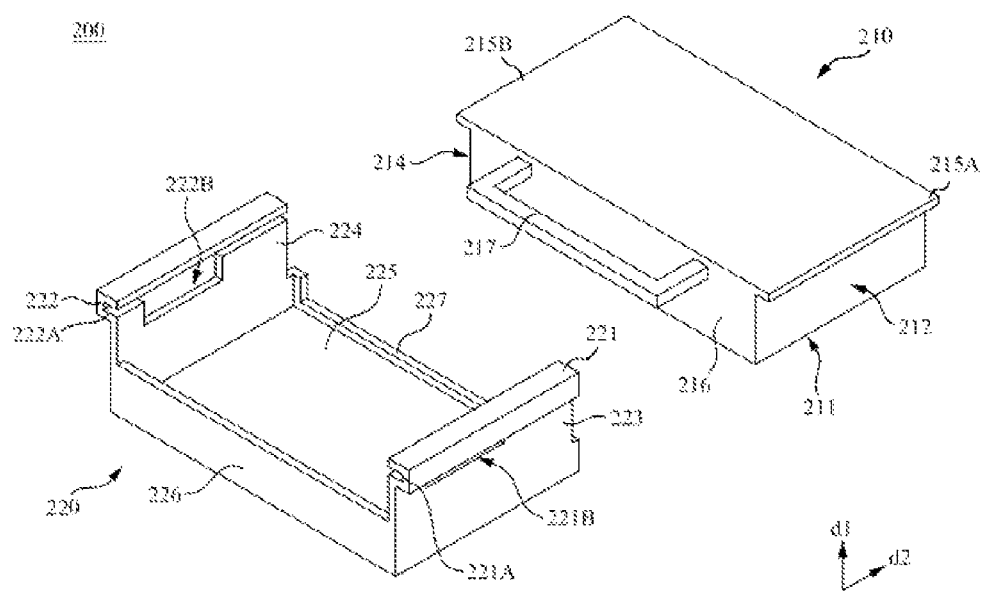
FIG. 6 is a perspective exploded view of a processing carrier module according to another embodiment of the present disclosure.

FIG. 6 is a perspective exploded view of a processing carrier module 200 according to another embodiment of the present disclosure. Please refer to FIG. 6. The processing carrier module 200 in another embodiment comprises a carrier layer 210 and a container 220. The carrier layer 210 comprises a carrier surface 211, a first lateral surface 212, and a second lateral surface 214. The carrier surface 211 is connected to the first lateral surface 212 and the second lateral surface 214.

Further, the carrier layer 210 is similar to the carrier layer 110 described above, and the same or similar elements and their detailed description are not repeated herein. A first holding structure 217 is formed on the third lateral surface 216 of the carrier layer 210. The first lateral surface 212 of the carrier layer 210 is opposite to the second lateral surface 214 of the carrier layer 210. A first protruding structure 215A is formed on the first lateral surface 212, and a second protruding structure 215B is formed on the second lateral surface 214.

The container 220 comprises a first fastening structure 221 and a second fastening structure 222. The first fastening structure 221 and the second fastening structure 222 are formed on opposite sides of the container 220. Further, the first fastening structure 221 is formed on a first sidewall 223 of the container 220. The second fastening structure 222 is formed on a second sidewall 224. The container 220 further has a third sidewall 226, a fourth sidewall 227 opposite to the third sidewall 226, and a receiving layer 225 connected to the first sidewall 223, the second sidewall 224, the third sidewall 226, and the fourth sidewall 227.

In the embodiment, the first protruding structure 215A is formed on an edge of the first lateral surface 212 facing away from the carrier surface 211, and the second protruding structure 215B is formed on an edge of the second lateral surface 214 facing away from the carrier surface 211. The first protruding structure 215A and the second protruding structure 215B extend along the second direction d2.

The first fastening structure 221 comprises a first recess 221A extending along the second direction d2, and the second fastening structure 222 comprises a second recess 222A extending along the second direction d2. Since the extending directions of the first protruding structure 215A, the second protruding structure 215B, the first fastening structure 221, and the second fastening structure 222 are parallel to each other, the carrier layer 210 may be inserted along the second direction d2 and engage with the container 220.

Figure 7:
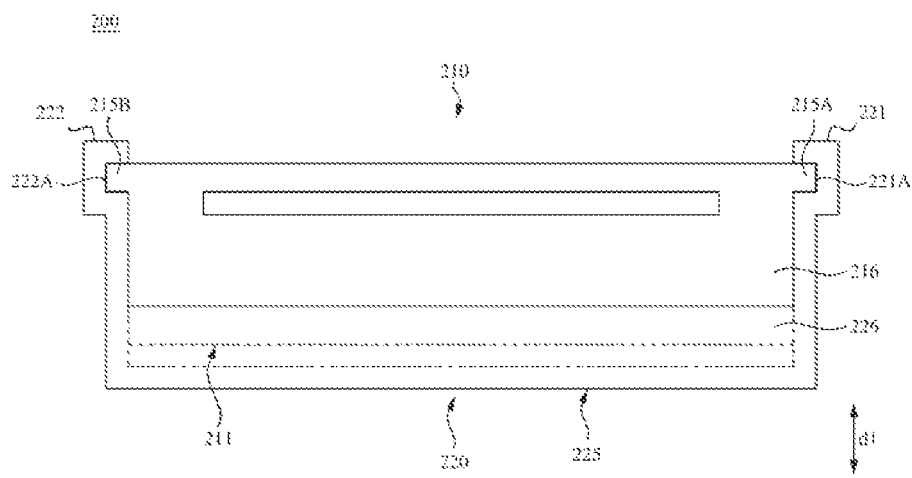
FIG. 7 is a top view of a processing carrier module according to another embodiment of the present disclosure.

FIG. 7 is a top view of the processing carrier module 200 according to another embodiment of the present disclosure. Please refer to FIG. 7. In the embodiment, the first protruding structure 215A may engage with the first recess 221A of the first fastening structure 221, and the second protruding structure 215B may engage with the second recess 222A of the second fastening structure 222, thereby locking the relative positons of the carrier layer 210 and the container 220 in the first direction d1.

Moreover, in the first direction d1, the third sidewall 226 and the third lateral surface 216 overlap with each other. Therefore, the third sidewall 226 may limit the relative positions of the carrier layer 210 and the container 220 in the second direction d2. Simultaneously, a space between the carrier layer 210 and the receiving layer 225 may contain 3D objects.

Please refer to FIG. 6. In the embodiment, container 220 further comprises a third opening 221B and a fourth opening 222B. The third opening 221B is adjacent to the first recess 221A, and the fourth opening 222B is adjacent to the second recess 222A. To be specific, when the container 220 engages with the carrier layer 210, the third opening 221B may expose a portion of the first lateral surface 212 and the first protruding structure 215A, and the fourth opening 222B may expose a portion of the second lateral surface 214 and the second protruding structure 215B. Therefore, in the embodiments, the first fastening structure 221 and the second fastening structure 222 may also be held by users, while the third opening 221B and the fourth opening 222B may allow the users to simultaneously contact the first protruding structure 215A and the second protruding structure 215B to prevent relative sliding between the container 220 and the carrier layer 210 during the moving process.

Figure 8:
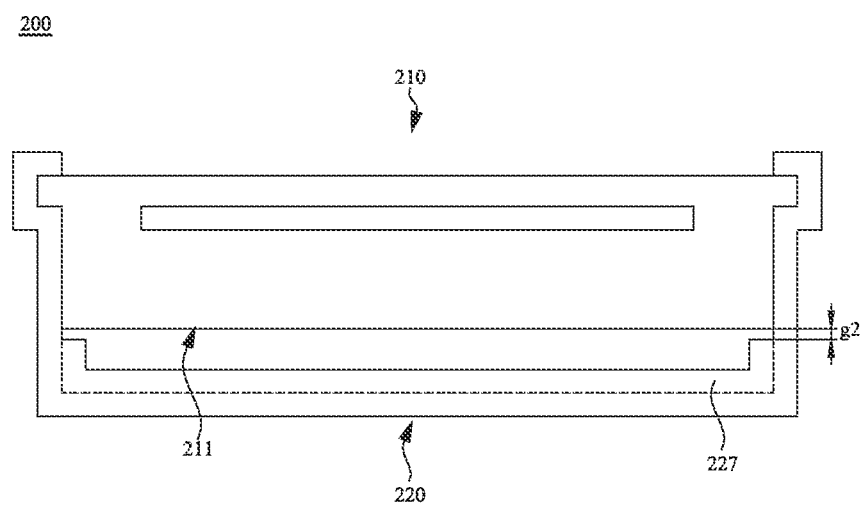
FIG. 8 is a bottom view of a processing carrier module according to another embodiment of the present disclosure.

FIG. 8 is a bottom view of a processing carrier module 200 according to another embodiment of the present disclosure. Please refer to FIG. 8, the fourth sidewall 227 in the embodiment is substantially formed in a U shape, and there is at least a distance g2 between the fourth sidewall 227 and the carrier surface 211 in the first direction d1. Therefore, the carrier layer 210 may more easily move over the fourth sidewall 227 and into the container 220. When the container 220 receives resin from the carrier surface 211, the fourth sidewall 227 may also prevent the resin from flowing out.

Figure 9:
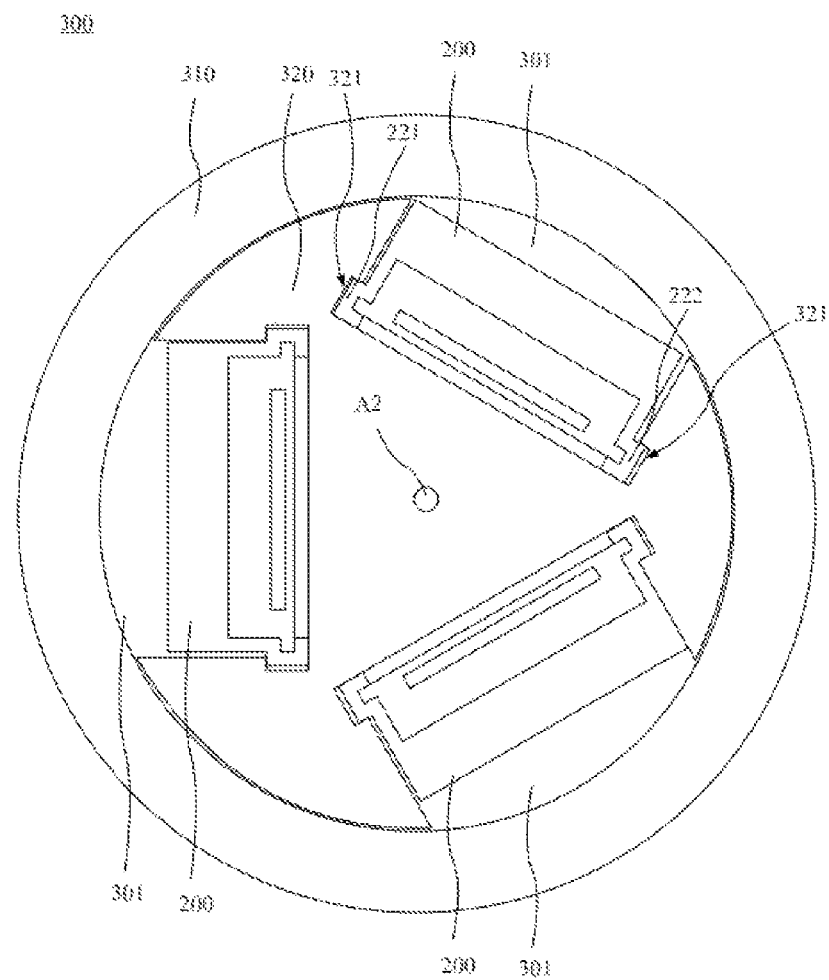
FIG. 9 is a top view of a spin dry device according to yet another embodiment of the present disclosure.

FIG. 9 is a top view of a spin dry device according to yet another embodiment of the present disclosure. Please refer to FIG. 9. In yet another embodiment, the spin dry device 300 comprises a shell 310, a rotating device 320, and the processing carrier module 200.

The rotating device 320 is connected to the shell 310 by a first rotating shaft A2. A plurality of containing spaces 301 are formed between the shell 310 and the rotating device 320. Two sides of each of the plurality of containing spaces 301 have a locking recess 321. The processing carrier module 200 is arranged in one of the plurality of containing spaces 301, and a portion of the processing carrier module 200 inserts into the locking recess 321 of the two sides of the one of the plurality of containing spaces 301.

To be specific, in the embodiment, the spin dry device 300 has three containing spaces 301 containing three processing carrier modules 200 at the same time, but the present disclosure is not limited in this regard. The two locking recesses 321 located on two sides of the containing space 301 may respectively contain the first fastening structure 221 and the second fastening structure 222 of the processing carrier module 200. Therefore, when the processing carrier module 200 rotates with the rotating device 320 along the first rotating shaft A2, the rotating device 320 and the shell 310 are not separated.

Figure 10:
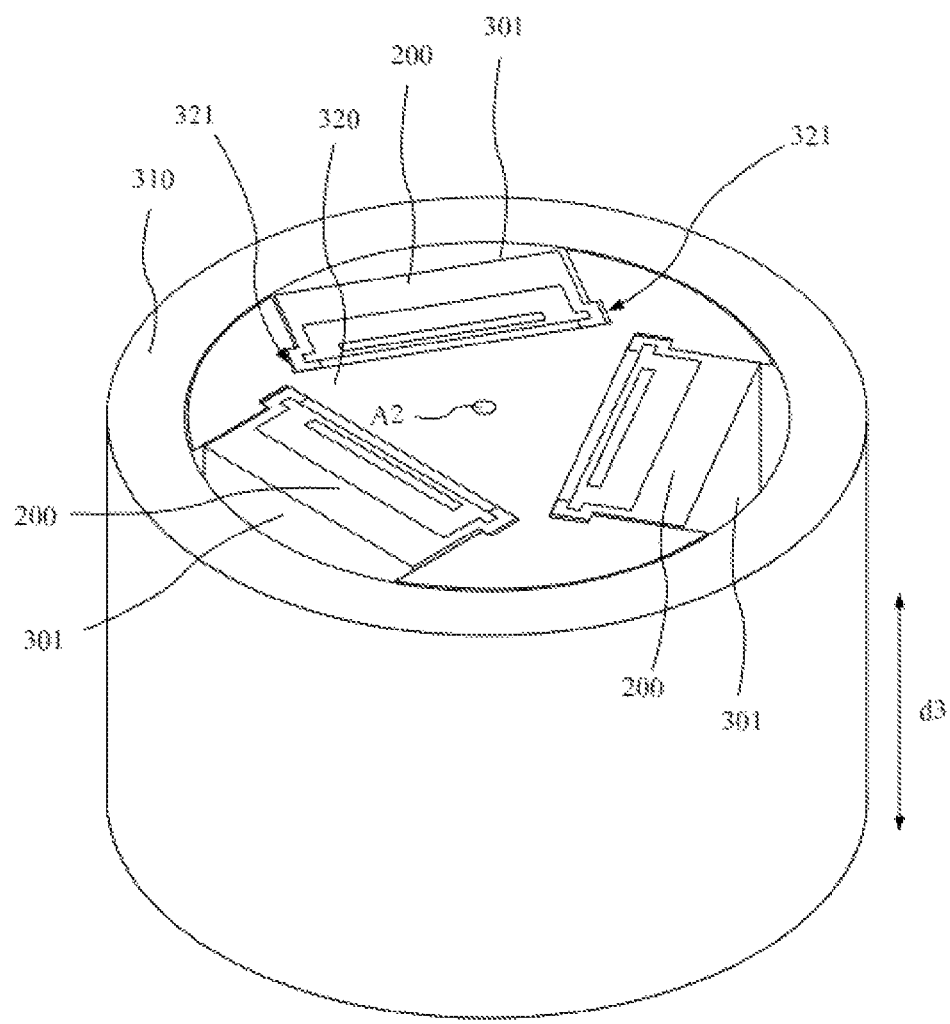
FIG. 10 is a perspective view of a spin dry device according to yet another embodiment of the present disclosure.

FIG. 10 is a perspective view of a spin dry device according to yet another embodiment of the present disclosure. Please refer to FIG. 10, the extending direction of the locking recess 321 is the same as the rotating direction of the first rotating shaft A2. To be specific, the locking recess 321 and the first rotating shaft A2 may be parallel to a third direction d3, so the processing carrier module 200 may enter and exit along the third direction d3 and may rotate with the rotating device 320 along the first rotating shaft A2.

The embodiments described above are based on the processing carrier module 200 as the example, but the present disclosure is not limited in this regard. In other embodiments, the spin dry device 300 may also comprise the processing carrier module 100 in the embodiment (please see FIG. 1) and may lock the second holding structure 119 and the third holding structure 1110.

In summary, the processing carrier module and the spin dry device in the embodiments of the present disclosure may engage with the carrier layer by the container, and the carrier surface of the carrier layer may carry 3D objects formed by resin. When the processing carrier module is in the spin drying process, the container may receive the residual resin on the 3D objects and may prevent the residual resin from being contaminated, thereby providing effective function of recycling.

The description above is only preferred embodiments of the present disclosure, and the present disclosure is not limited in this regard. It will be apparent to those skilled in the art that various modifications and variations can be made to the structure of the present disclosure without departing form the scope or spirit of the invention.

What is claimed is:

1. A processing carrier module, comprising:
   a carrier layer, comprising:
      a carrier surface;
      a first lateral surface connected to the carrier surface and having at least one first protruding structure;
      a second lateral surface connected to the carrier surface and having at least one second protruding structure, the first lateral surface opposite to the second lateral surface; and
      a third lateral surface having a first holding structure and extending perpendicular to the first lateral surface and the second lateral surface, wherein the first holding structure protrudes from the third lateral surface in a direction perpendicular to the third lateral surface; and
   a container, comprising:
      at least one first fastening structure;
      at least one second fastening structure, the first fastening structure and the second fastening structure respectively disposed on opposite sides of the container, the first fastening structure engaging with the first protruding structure, and the second fastening structure engaging with the second protruding structure; and
      a first sidewall having a first surface and a second surface, wherein the first surface faces the third lateral surface and the first holding structure protrudes from the third lateral surface beyond the second surface.

2. The processing carrier module of claim 1, wherein the container comprises a receiving layer, a second sidewall, and a third sidewall, the second first sidewall is opposite to the third sidewall, the receiving layer is connected to the second sidewall and the third sidewall, the first fastening structure is defined in the second sidewall, and the second fastening structure is defined in the third sidewall.

3. The processing carrier module of claim 2, wherein the first sidewall has a first opening, the first holding structure passes through the first opening, and the first sidewall is connected to the second sidewall, the third sidewall, and the receiving layer.

4. The processing carrier module of claim 3, wherein the container comprises a fourth sidewall opposite to the first sidewall, and the fourth sidewall has a second opening.

5. The processing carrier module of claim 4, wherein the first sidewall has a first height in a first direction, the fourth sidewall has a second height in the first direction, the first height is greater than the second height, and the first direction is parallel to a normal vector of the carrier surface.

6. The processing carrier module of claim 4, wherein the fourth sidewall in a first direction has a distance from the carrier surface, and the first direction is parallel to a normal vector of the carrier surface.

7. The processing carrier module of claim 1, wherein the first lateral surface has a second holding structure disposed on an edge of the first lateral surface facing away from the carrier surface, the first protruding structure is disposed adjacent to the carrier surface, the second lateral surface has a third holding structure disposed on an edge of the second lateral surface facing away from the carrier surface, and the second protruding structure is disposed adjacent to the carrier surface.

8. The processing carrier module of claim 7, wherein the second holding structure and the third holding structure extend along a second direction, each of the first fastening structure and the second fastening structure is a bent opening, and a portion of the first fastening structure and a portion of the second fastening structure extend along the second direction.

9. The processing carrier module of claim 1, wherein the first protruding structure is disposed on an edge of the first lateral surface facing away from the carrier surface, the second protruding structure is disposed on an edge of the second lateral surface facing away from the carrier surface, the first protruding structure and the second protruding structure extend along a second direction, the first fastening structure comprises a first recess extending along the second direction, and the second fastening structure comprises a second recess extending along the second direction.

10. The processing carrier module of claim 9, wherein the container comprises a third opening and a fourth opening, the third opening is adjacent to the first recess, and the fourth opening is adjacent to the second recess.

11. A spin dry device, comprising:
   a shell;
   a rotating device connected to the shell by a first rotating shaft, wherein:
      a plurality of containing spaces are defined between the shell and the rotating device,
      on a first surface of the rotating device, two sides of each of the plurality of containing spaces have a locking recess having a width, measured in a first direction perpendicular to a rotating direction of the first rotating shaft, that is different than a width of a corresponding one of the plurality of containing spaces, and
      an extending direction of the locking recess is the same as the rotating direction of the first rotating shaft; and
   a processing carrier module arranged in one of the plurality of containing spaces, wherein a portion of the processing carrier module inserts into the locking recess of the two sides of the one of the plurality of containing spaces, and the processing carrier module comprises:
      a carrier layer, comprising:
         a carrier surface;
         a first lateral surface connected to the carrier surface and having at least one first protruding structure; and
         a second lateral surface connected to the carrier surface and having at least one second protruding structure, the first lateral surface opposite to the second lateral surface; and
      a container, comprising:
         at least one first fastening structure; and
         at least one second fastening structure, the first fastening structure and the second fastening structure respectively disposed on opposite sides of the container, the first fastening structure engaging with the first protruding structure, and the second fastening structure engaging with the second protruding structure.

12. The spin dry device of claim 11, wherein the container comprises a receiving layer, a first sidewall, and a second sidewall, the first sidewall is opposite to the second sidewall, the receiving layer is connected to the first sidewall and the second sidewall, the first fastening structure is defined in the first sidewall, and the second fastening structure is defined in the second sidewall.

13. The spin dry device of claim 12, wherein the carrier layer comprises a third lateral surface having a first holding structure, the container comprises a third sidewall having a first opening, the first holding structure passes through the first opening, and the third sidewall is connected to the first sidewall, the second sidewall, and the receiving layer.

14. The spin dry device of claim 13, wherein the container comprises a fourth sidewall opposite to the third sidewall, and the fourth sidewall has a second opening.

15. The spin dry device of claim 14, wherein the third sidewall has a first height in a second direction, the fourth sidewall has a second height in the second direction, the first height is greater than the second height, and the second direction is parallel to a normal vector of the carrier surface.

16. The spin dry device of claim 14, wherein the fourth sidewall in a second direction has a distance from the carrier surface, and the second direction is parallel to a normal vector of the carrier surface.

17. The spin dry device of claim 11, wherein the first lateral surface has a second holding structure disposed on an edge of the first lateral surface facing away from the carrier surface, the first protruding structure is disposed adjacent to the carrier surface, the second lateral surface has a third holding structure disposed on an edge of the second lateral surface facing away from the carrier surface, and the second protruding structure is disposed adjacent to the carrier surface.

18. The spin dry device of claim 17, wherein the second holding structure and the third holding structure extend along a second direction, each of the first fastening structure and the second fastening structure is a bent opening, and a portion of the first fastening structure and a portion of the second fastening structure extend along the second direction.

19. The spin dry device of claim 11, wherein the first protruding structure is disposed on an edge of the first lateral surface facing away from the carrier surface, the second protruding structure is disposed on an edge of the second lateral surface facing away from the carrier surface, the first protruding structure and the second protruding structure extend along a second direction, the first fastening structure comprises a first recess extending along the second direction, and the second fastening structure comprises a second recess extending along the second direction.

20. The spin dry device of claim 19, wherein the container comprises a third opening and a fourth opening, the third opening is adjacent to the first recess, and the fourth opening is adjacent to the second recess.

* * * * *